(No Model.)
L. DENNY.
HOE.
No. 444,393. Patented Jan. 6, 1891.
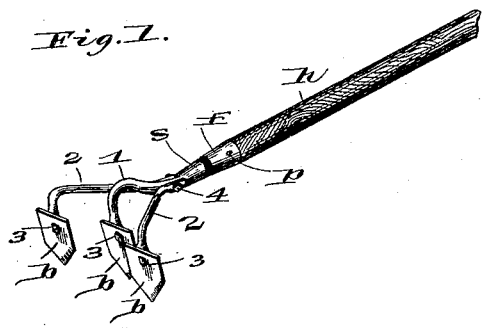
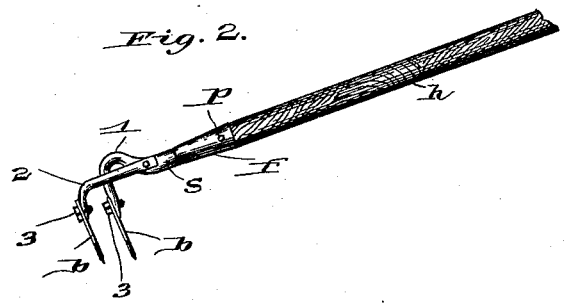
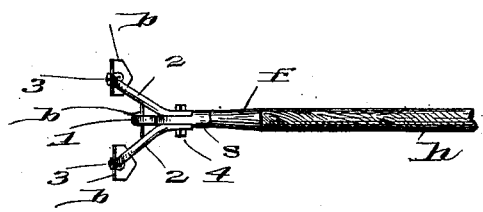
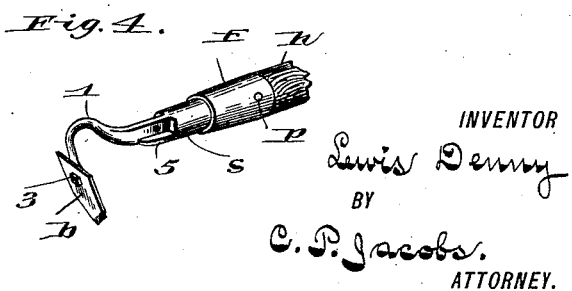
WITNESSES:
F. D. Nealy
E. B. Griffith.
INVENTOR
Lewis Denny
BY
C. P. Jacobs.
ATTORNEY.

UNITED STATES PATENT OFFICE.

LEWIS DENNY, OF ADVANCE, INDIANA, ASSIGNOR OF ONE-HALF TO NATHANIEL GRAYBILL, OF SAME PLACE.

HOE.

SPECIFICATION forming part of Letters Patent No. 444,393, dated January 6, 1891.

Application filed April 24, 1890. Serial No. 349,381. (No model.)

*To all whom it may concern:*

Be it known that I, LEWIS DENNY, of Advance, county of Boone, and State of Indiana, have invented certain new and useful Improvements in Hoes; and I do hereby declare that the following is a full, clear, and exact description thereof, reference being had to the accompanying drawings, in which like letters refer to like parts.

My invention relates to the construction of cultivating-hoes, and will be understood from the following description.

In the drawings, Figure 1 is a perspective view of my device. Fig. 2 is a side view of the same. Fig. 3 is a top view. Fig. 4 is a view of the central hoe and shank with the side shanks removed.

In detail my device consists of a central shank $s$, having a curved end 1, to which is connected a blade $b$ by a bolt 3. This shank is cut out or recessed on the sides, as shown at 5 in Fig. 4, furnishing a bearing for the auxiliary shanks 2, to which blades are connected in the same manner as the central one, these auxiliary shanks squared to fit in the recess 5, a bolt 4 passing through all, and by loosening this bolt the side shanks may be detached and the implement used with a single blade, or, if it is desired to straddle the row, the central blade 1 may be detached from its shank and the blades on either side used alone. The central shank 3 enters a handle $h$, over which is slipped a ferrule $f$, and is secured therein by a rivet or pin $p$, passing through an opening in the shank and ferrule in the usual manner. The middle hoe is set back beyond the line of the side hoes, as shown in Fig. 3; but the lower ends of the blades are upon the same line. My device, therefore, can be used with one, two, or three blades, as desired. When all are connected, rapid progress can be made in the work of cultivating a garden by the use of this implement.

What I claim as my invention, and desire to secure by Letters Patent, is the following:

A cultivator-hoe comprising the handle $h$, central shank $s$, having shouldered recesses 5 formed on the sides thereof, lateral shanks 2 2, adapted to fit in such recesses, connected to the central shank by a bolt 4, and blades 3, detachably connected to the main and lateral shanks, all combined substantially as shown and described.

In witness whereof I have hereunto set my hand this 21st day of April, 1890.

LEWIS DENNY.

Witnesses:
E. B. GRIFFITH,
C. P. JACOBS.